(12) United States Patent
Greenbank

(10) Patent No.: US 10,807,034 B2
(45) Date of Patent: Oct. 20, 2020

(54) SORBENT DEVICES

(71) Applicant: Calgon Carbon Corporation, Moon Township, PA (US)

(72) Inventor: Michael Greenbank, Monaca, PA (US)

(73) Assignee: CALGON CARBON CORPORATION, Moon Township, PA (US)

(*) Notice: Subject to any disclaimer, the term of this patent is extended or adjusted under 35 U.S.C. 154(b) by 139 days.

(21) Appl. No.: 15/885,317

(22) Filed: Jan. 31, 2018

(65) Prior Publication Data

US 2018/0214816 A1 Aug. 2, 2018

Related U.S. Application Data

(60) Provisional application No. 62/452,704, filed on Jan. 31, 2017.

(51) Int. Cl.
| | | |
|---|---|---|
| *B01D 53/04* | (2006.01) | |
| *B01J 20/20* | (2006.01) | |
| *B01J 20/28* | (2006.01) | |
| *B01D 53/02* | (2006.01) | |
| *B67D 7/04* | (2010.01) | |
| *F02M 25/08* | (2006.01) | |

(52) U.S. Cl.
CPC ......... *B01D 53/0415* (2013.01); *B01D 53/02* (2013.01); *B01J 20/20* (2013.01); *B01J 20/2804* (2013.01); *B01J 20/28011* (2013.01); *B01J 20/28035* (2013.01); *B67D 7/0476* (2013.01); *F02M 25/0854* (2013.01); *B01D 2253/102* (2013.01); *B01D 2253/34* (2013.01); *B01D 2257/702* (2013.01); *B01D 2259/4516* (2013.01); *B01D 2259/4566* (2013.01)

(58) Field of Classification Search
CPC .... B01D 53/02; B01D 53/04; B01D 53/0415; B01D 2253/102; B01D 2253/34; B01D 2257/702; B01D 2259/4516; B01D 2259/4566; B01J 20/20; B01J 20/28011; B01J 20/28035; B01J 20/2804; F02M 25/08; F02M 25/0854
USPC ..... 95/146; 96/108, 147, 153, 154; 123/518, 123/519
See application file for complete search history.

(56) References Cited

U.S. PATENT DOCUMENTS

| | | | |
|---|---|---|---|
| 2,038,071 A * | 4/1936 | Wilhelm | B01D 46/0038 96/118 |
| 3,713,281 A * | 1/1973 | Asker | B01J 8/008 96/154 |
| 3,730,158 A | 5/1973 | St. Amand | |
| 3,757,488 A | 9/1973 | Austin et al. | |
| 4,331,639 A | 5/1982 | Hass | |
| 5,016,628 A | 5/1991 | Lambert | |
| 5,064,805 A | 11/1991 | Otowa | |
| 5,322,778 A | 6/1994 | Antrim | |
| 5,338,458 A | 8/1994 | Carrubba et al. | |
| 5,348,755 A | 9/1994 | Roy | |
| 5,352,274 A * | 10/1994 | Blakley | B01D 39/18 55/497 |
| 5,500,038 A | 3/1996 | Dauber et al. | |
| 5,598,721 A | 2/1997 | Rockenfeller et al. | |
| 5,726,118 A | 3/1998 | Ivey | |
| 5,754,002 A | 5/1998 | Haitko et al. | |
| 5,821,682 A | 10/1998 | Foust et al. | |
| 5,861,050 A | 1/1999 | Pittel et al. | |
| 5,897,779 A | 4/1999 | Wisted et al. | |
| 6,176,897 B1 | 1/2001 | Keefer | |
| 6,186,939 B1 | 2/2001 | Forrester | |
| 6,342,129 B1 | 1/2002 | Vaughn et al. | |
| 6,406,523 B1 | 6/2002 | Connor et al. | |
| 6,599,856 B1 | 7/2003 | Uchino et al. | |
| 6,699,393 B2 | 3/2004 | Baker et al. | |
| 6,706,194 B2 | 3/2004 | Baker et al. | |
| 6,848,374 B2 | 2/2005 | Srinivasachar et al. | |
| RE38,844 E | 10/2005 | Hiltzik et al. | |
| 7,077,891 B2 * | 7/2006 | Jaffe | B01D 53/0423 96/108 |
| 7,222,612 B2 | 5/2007 | Hagler et al. | |
| 7,278,406 B2 | 10/2007 | Hagler | |
| 7,547,350 B2 | 6/2009 | Callahan et al. | |
| 7,666,507 B2 | 2/2010 | Ishikawa et al. | |

(Continued)

FOREIGN PATENT DOCUMENTS

| | | |
|---|---|---|
| EP | 0433677 A1 | 6/1991 |
| EP | 1413348 A1 | 4/2004 |

(Continued)

OTHER PUBLICATIONS

International Search Report and Written Opinion dated Oct. 28, 2014 in corresponding International Patent Application No. PCT/US2014/043158.
International Search Report and Written Opinion for PCT/US2016/033556 dated Aug. 26, 2016.
Raposo et al., Mercury Speciation in Flourescent Lamps by Thermal Release Analysis, Waste Manage. (2003), 23(10):879-886.
Supplementary European Search Report in corresponding European Application No. 14813604.7 dated Jan. 30, 2017.

(Continued)

*Primary Examiner* — Frank M Lawrence, Jr.
(74) *Attorney, Agent, or Firm* — Troutman Pepper Hamilton Sanders LLP

(57) ABSTRACT

Sorbent material sheets provide for enhanced performance in vapor adsorbing applications over conventional canisters and other emissions control equipment. The sorbent material sheets can be formed as part of a small, lightweight canister, or can be integrated into a fuel tank. The sorbent material sheets can also be used as part of an onboard refueling vapor recovery system to control volatile organic compound emissions from fuel tanks of gasoline vehicles, such as automobiles.

45 Claims, No Drawings

(56) References Cited

U.S. PATENT DOCUMENTS

| | | | |
|---|---|---|---|
| 7,704,305 B2* | 4/2010 | Nishida | B01D 53/261 96/154 |
| 7,780,765 B2 | 8/2010 | Srinivasachar et al. | |
| 7,858,061 B2 | 12/2010 | Varma et al. | |
| 7,862,725 B2 | 1/2011 | Mazyck et al. | |
| 7,879,136 B2 | 2/2011 | Mazyck | |
| 8,034,163 B1 | 10/2011 | Durham et al. | |
| 8,042,524 B2 | 10/2011 | Elum et al. | |
| 8,057,576 B1 | 11/2011 | Pollack | |
| 8,069,797 B2 | 12/2011 | Srinivasachar et al. | |
| 8,168,147 B2 | 5/2012 | Olson et al. | |
| 8,263,524 B1 | 9/2012 | Skandan et al. | |
| 8,632,334 B2 | 1/2014 | Knueppel et al. | |
| 8,864,877 B2 | 10/2014 | Nishita et al. | |
| 8,888,901 B2 | 11/2014 | Kimoto | |
| 9,732,649 B2 | 8/2017 | Hiltzik et al. | |
| 2002/0170436 A1 | 11/2002 | Keefer et al. | |
| 2003/0188663 A1 | 10/2003 | Barthel et al. | |
| 2004/0118387 A1* | 6/2004 | Lawrence | B01D 53/02 123/518 |
| 2004/0197612 A1 | 10/2004 | Keefer et al. | |
| 2005/0081717 A1* | 4/2005 | Meiller | B01D 53/02 96/154 |
| 2005/0167367 A1 | 8/2005 | Baker | |
| 2006/0042467 A1* | 3/2006 | Maru | B01D 53/0407 96/134 |
| 2006/0054142 A1 | 3/2006 | Burke et al. | |
| 2007/0169758 A1* | 7/2007 | Mills | F02M 25/0854 123/518 |
| 2007/0272080 A1* | 11/2007 | Allen | F02M 25/0854 96/134 |
| 2008/0121142 A1 | 5/2008 | Comrie et al. | |
| 2008/0308075 A1 | 12/2008 | Allen et al. | |
| 2009/0172998 A1 | 7/2009 | Harris et al. | |
| 2009/0223370 A1 | 9/2009 | Kosugi et al. | |
| 2010/0178624 A1 | 7/2010 | Srinivasachar | |
| 2011/0030592 A1 | 2/2011 | Baldrey et al. | |
| 2012/0048110 A1 | 3/2012 | Dawes et al. | |
| 2012/0100054 A1 | 4/2012 | Durham et al. | |
| 2013/0078169 A1 | 3/2013 | LaFlesh et al. | |
| 2013/0109562 A1 | 5/2013 | Wong et al. | |
| 2013/0269532 A1 | 10/2013 | Kimoto | |
| 2013/0330257 A1 | 12/2013 | Tramposch | |
| 2014/0117054 A1 | 5/2014 | Ryan et al. | |
| 2014/0165542 A1 | 6/2014 | Loftin et al. | |
| 2014/0374655 A1 | 12/2014 | Mimna | |
| 2015/0050202 A1 | 2/2015 | Filippelli et al. | |
| 2016/0166972 A1 | 6/2016 | Owens et al. | |
| 2016/0271555 A1* | 9/2016 | Hiltzik | F02M 25/0854 |
| 2018/0030871 A1 | 2/2018 | Hiltzik et al. | |
| 2018/0229217 A1 | 8/2018 | Mazzoccoli et al. | |
| 2019/0247831 A1 | 8/2019 | Tramposch et al. | |

FOREIGN PATENT DOCUMENTS

| | | | |
|---|---|---|---|
| GB | 1336241 | | 11/1973 |
| JP | 2008-023365 | * | 2/2008 |
| WO | 2004089501 A2 | | 10/2004 |
| WO | 2010042321 A1 | | 4/2010 |
| WO | 2011038415 A2 | | 3/2011 |
| WO | 2011127323 A2 | | 10/2011 |
| WO | 2013063490 A1 | | 5/2013 |
| WO | 2014082076 A1 | | 5/2014 |
| WO | 2014088630 A1 | | 6/2014 |
| WO | 2014205200 A1 | | 12/2014 |
| WO | 2018144588 A1 | | 8/2018 |

OTHER PUBLICATIONS

International Search Report and Written Opinion for PCT/US2018/016213 dated Apr. 6, 2018.

International Search Report and Written Opinion for Application No. PCT/US2019/044958 dated Oct. 24, 2019.

International Search Report and Written Opinion for PCT/US2019/44964 dated Oct. 18, 2019.

* cited by examiner

SORBENT DEVICES

CROSS-REFERENCE TO RELATED APPLICATIONS

This application claims priority to U.S. Provisional Application No. 62/452,704 filed on Jan. 31, 2017, the entirety of which is incorporated by reference.

GOVERNMENT INTERESTS

Not applicable

PARTIES TO A JOINT RESEARCH AGREEMENT

Not applicable

INCORPORATION BY REFERENCE OF MATERIAL SUBMITTED ON A COMPACT DISC

Not applicable

BACKGROUND

Evaporative emissions from gasoline and other liquid hydrocarbon fuels are a significant source of air pollution because the various hydrocarbons contained in the fuels can form photochemical smog on exposure to sunlight. The compounds of this smog and the hydrocarbons themselves cause degrading health effects in humans and animals as well as environmental damage. Evaporative emissions are especially problematic during vehicle refueling because the "empty" fuel tank is actually filled with fuel vapors, and the act of filling the tank with liquid fuel displaces the vapors from the tank. Evaporative emissions also occur when the fuel within the tank is heated, such as from hot ambient conditions or from nearby hot exhaust system components. Without controls, fuel vapors would be released as pollution into the atmosphere.

In the automotive sector, gasoline vapors are typically recovered during refueling by an Onboard Refueling Vapor Recovery system (ORVR). These devices include multiple components which are designed to capture the displaced vapors from gasoline refueling and allow the engine to burn them at a later time. Vapors remain sealed within the fuel tank by specially designed tanks and fuel filler neck, and excess vapor is captured and adsorbed within a chemical canister. During engine operation, the Engine Control Unit (ECU) permits adsorbed vapors to be released from the canister and into the engine fuel system, burning the gasoline vapors as normal and permitting the canister to be used again.

While ORVR systems have been successful in reducing vapor emissions, they still have drawbacks. The chemical canisters are filled with loose adsorbent particulates such as activated carbon or charcoal, which can be messy to handle and package. These canisters are bulky and heavy because the adsorbent particulates cannot physically support themselves, and because stringent emissions regulations now prohibit the release of even small amounts of vapor emissions, which requires higher adsorbent capacity. Manufacturing, maintenance and disposal of the canisters is also cumbersome because of the loose adsorbent particulates, and the complexity of ORVR devices increases the cost of each vehicle while cutting into valuable passenger and cargo space. With automakers demanding lighter weights from all components to meet increasing fuel efficiency targets, as well as cost reductions and greater passenger and cargo space, there is a need for new ORVR devices and that are smaller, lighter, simpler, and more cost effective, while still complying with stricter emissions targets.

SUMMARY OF THE INVENTION

In one embodiment, the invention discloses sorbent material sheets that have improved performance over the equivalent amount of adsorbent compound provided as a powder.

In another embodiment, the invention discloses sorbent material sheets enclosed within a housing.

In another embodiment, the invention discloses sorbent material sheets that omit the housing and which are instead contained directly within a fuel tank.

In another embodiment, the invention discloses an emissions control system, such as an ORVR which includes sorbent material sheets. The sorbent material sheets within the ORVR may be enclosed within a housing or the housing may be omitted.

The invention is also directed to the embodiments listed below:

1. A sorbent material sheet product, comprising
   at least two sorbent material sheets, each of which has a defined upper surface and lower surface which have a combined total surface area, and
   wherein each sorbent material sheet comprises a sorbent material and a binder, and
   wherein each sorbent material sheet is stacked and arranged such that adjacent upper and lower surfaces of the separate sheets are substantially parallel and are aligned to allow fluid flow at least between the adjacent upper and lower surfaces.
2. The sorbent material sheet product of embodiment 1, wherein the sorbent material sheet product has a BWC stacking multiplier ratio of about 1.1 to about 1.3, wherein the BWC stacking multiplier ratio is defined by the formula:

BWC stacking multiplier ratio=[(measured BWC of entire sorbent material sheet product)/(measured BWC of individual sorbent material sheet outside of product)]/number of sorbent material sheets in the sorbent material sheet product.

3. The sorbent material sheet product of embodiment 1, wherein the individual sorbent material sheets, measured individually, have BWC values that are 5-15% higher than the BWC of the same weight of sorbent material in pelletized or powdered forms.
4. The sorbent material sheet product of embodiment 1, wherein at least one of the sorbent material sheets are configured as being flat, wound in a spiral cylinder, wound in an elliptical form, wound in an elongate rectangular bar, folded, laminated in an "S" shape, formed as concentric cylinders, formed as concentric ellipses, formed as a concentric rectangular bar, or as combinations of these forms.
5. The sorbent material sheet product of embodiment 1, wherein at least one of the sorbent material sheets has raised and/or depressed portions.
6. The sorbent material sheet product of embodiment 5, wherein the raised and/or depressed portions are present on adjacent sheets and are nested.
7. The sorbent material sheet product of embodiment 5, wherein the raised and/or depressed portions are present on adjacent sheets and are not nested.

8. The sorbent material sheet product of embodiment 1, wherein the sorbent material sheet product has a void volume of about 10% or less.
9. The sorbent material sheet product of embodiment 1, wherein each individual sorbent material sheet has a density of about 0.08 g/cc to about 1.5 g/cc.
10. The sorbent material sheet product of embodiment 1, wherein the sorbent material sheet product has a BWC greater than about 10 g/100 cc.
11. The sorbent material product of embodiment 1, wherein the sorbent material sheet product has a BWC of about 7.0 g/100 cc to about 30 g/100 cc.
12. The sorbent material sheet product of embodiment 1, wherein the sorbent material sheets comprise sorbent material particles having at least two populations having different average particle diameters, and wherein the average particle diameters of the two populations have ratios of about 1:2 to about 1:10.
13. The sorbent material sheet product of embodiment 1, wherein the amount of binder and the amount of sorbent material sheet products are present in a gradient such that the amount of binder is highest at an outer portion of the sorbent material sheet product, and that the amount of binder is lowest at an inner portion of the sorbent material sheet product.
14. The sorbent material sheet product of embodiment 1, wherein at least one sorbent material sheet include holes, cuts, or apertures.
15. The sorbent material sheet product of embodiment 1, wherein the binder comprises polytetrafluoroethylenes (PTFE or TEFLON), polyvinylidene fluorides ($PVF_2$ or PVDF), ethylene-propylene-diene (EPDM) rubbers, polyethylene oxides (PEO), UV curable acrylates, UV curable methacrylates, heat curable divinyl ethers, polybutylene terephthalate, acetal or polyoxymethylene resin, fluoroelastomers, perfluoroelastomers (FFKM) and/or tetrafluoro ethylene/propylene rubbers (FEPM), aramid polymers, para-aramid polymers, meta-aramid polymers, poly trimethylene terephthalate, ethylene acrylic elastomers, polyimide, polyamide-imides, polyurethanes, low density and high density polyethylene, polypropylene, biaxially oriented polypropylene (BoPP), polyethylene terephthalate (PET), biaxially oriented polyethylene terephthalate (BoPET), polychloroprene, and copolymers and combinations thereof.
16. A rolled sorbent material sheet product, comprising:
   a sorbent material sheet defining an upper surface and a lower surface and having a total surface area, and which comprises a sorbent material and a binder,
   wherein the sorbent material sheet is spiral wound to form adjacent sheet layers which allow fluid flow around and between adjacent sheet layers.
17. The rolled sorbent material sheet product of embodiment 16, wherein the sorbent material sheet in its rolled form has a BWC that is at least 10% higher than the BWC of the same sorbent material sheet in an unrolled form.
18. The rolled sorbent material sheet product of embodiment 16, wherein the rolled sorbent material sheet product has a BWC that is at least 10% higher than the BWC of a pelletized or powdered form of the substantially the same amount of sorbent material in the sorbent sheet.
19. The rolled sorbent material sheet product of embodiment 16, wherein the rolled sorbent material sheet product has a generally cylindrical shape having a length that is greater than its diameter.
20. The rolled sorbent material sheet product of embodiment 16, wherein the rolled sorbent material sheet product is wound to an average roll density of 500-700 $kg/m^3$.
21. The rolled sorbent material sheet product of embodiment 16, wherein the rolled sorbent material sheet product has a butane working capacity greater than about 10 g/100 cc.
22. The rolled sorbent material sheet product of embodiment 16, wherein the rolled sorbent material sheet product has a butane working capacity of about 7.0 g/100 cc to about 30 g/100 cc.
23. The rolled sorbent material sheet product of embodiment 16, wherein the rolled sorbent material sheet comprises at least two populations of sorbent material particles, wherein each of the at least two populations have different average particle diameters.
24. The rolled sorbent material sheet product of embodiment 16, wherein the rolled sorbent material sheets comprise sorbent material particles having at least two populations having different average particle diameters, and wherein the average particle diameters of the two populations have ratios of about 1:2 to about 1:10.
25. The rolled sorbent material sheet product of embodiment 16, wherein the binder comprises polytetrafluoroethylenes (PTFE or TEFLON), polyvinylidene fluorides ($PVF_2$ or PVDF), ethylene-propylene-diene (EPDM) rubbers, polyethylene oxides (PEO), UV curable acrylates, UV curable methacrylates, heat curable divinyl ethers, polybutylene terephthalate, acetal or polyoxymethylene resin, fluoroelastomers, perfluoroelastomers (FFKM) and/or tetrafluoro ethylene/propylene rubbers (FEPM), aramid polymers, para-aramid polymers, meta-aramid polymers, poly trimethylene terephthalate, ethylene acrylic elastomers, polyimide, polyamide-imides, polyurethanes, low density and high density polyethylene, polypropylene, biaxially oriented polypropylene (BoPP), polyethylene terephthalate (PET), biaxially oriented polyethylene terephthalate (BoPET), polychloroprene, and copolymers and combinations thereof.
26. A vapor adsorbing canister, comprising:
   The sorbent material sheet product of embodiment 1, and
   a housing at least partially encapsulating the sorbent material sheet product of embodiment 1
27. The vapor adsorbing canister of embodiment 26, wherein the housing is flexible.
28. The vapor adsorbing canister of embodiment 26, wherein the housing comprises polytetrafluoroethylenes (PTFE or TEFLON), polyvinylidene fluorides ($PVF_2$ or PVDF), ethylene-propylene-diene (EPDM) rubbers, polyethylene oxides (PEO), UV curable acrylates, UV curable methacrylates, heat curable divinyl ethers, polybutylene terephthalate, acetal or polyoxymethylene resin, fluoroelastomers perfluoroelastomers (FFKM) and/or tetrafluoro ethylene/propylene rubbers (FEPM), aramid polymers, para-aramid, meta-aramid polymers, poly trimethylene terephthalate, ethylene acrylic elastomers, polyimide, polyamide-imides, polyurethanes, low density and high density polyethylene, polypropylene, biaxially oriented polypropylene (BoPP), polyethylene terephthalate (PET), biaxially oriented polyethylene terephthalate (BoPET), polychloroprene, and copolymers and combinations thereof.

29. The vapor adsorbing canister of embodiment 26, wherein the shape of the housing substantially conforms to the shape of the enclosed sorbent material sheet product of embodiment 1.

30. The vapor adsorbing canister of embodiment 26, further comprising at least one structure selected from tubes, inlet ports, outlet ports, sensors, valves, and fluid channels.

31. A vapor adsorbing canister, comprising,
   a. the rolled sorbent material sheet product of embodiment 16, and
   b. a housing at least partially encapsulating the rolled sorbent material sheet product of embodiment 16.

32. The vapor absorbing canister of embodiment 31, wherein the housing is flexible.

33. The vapor adsorbing canister of embodiment 31, wherein the housing comprises polytetrafluoroethylenes (PTFE or TEFLON), polyvinylidene fluorides (PVF$_2$ or PVDF), ethylene-propylene-diene (EPDM) rubbers, polyethylene oxides (PEO), UV curable acrylates, UV curable methacrylates, heat curable divinyl ethers, polybutylene terephthalate, acetal or polyoxymethylene resin, fluoroelastomers perfluoroelastomers (FFKM) and/or tetrafluoro ethylene/propylene rubbers (FEPM), aramid polymers, para-aramid, meta-aramid polymers, poly trimethylene terephthalate, ethylene acrylic elastomers, polyimide, polyamide-imides, polyurethanes, low density and high density polyethylene, polypropylene, biaxially oriented polypropylene (BoPP), polyethylene terephthalate (PET), biaxially oriented polyethylene terephthalate (BoPET), polychloroprene, and copolymers and combinations thereof.

34. The vapor absorbing canister of embodiment 31, wherein the shape of the housing substantially conforms to the shape of the enclosed rolled sorbent material sheet product of embodiment 16.

35. The vapor adsorbing canister of embodiment 31, further comprising at least one structure selected from tubes, inlet ports, outlet ports, sensors, valves, and fluid channels.

36. A tank with integral vapor adsorption, comprising:
   a tank structure, and
   at least one sorbent material sheet which has a defined upper surface and lower surface which have a combined total surface area, and
   wherein each sorbent material sheet comprises a sorbent material and a binder, and
   at least one fastening device which fastens the sorbent material sheet to a surface of the tank that is not regularly immersed in the volatile liquids contained within the tank.

37. The tank with integral vapor adsorption of embodiment 36, wherein the fastening device is an adhesive layer which is formed between one surface of the sorbent material sheet and a wall of the tank.

38. The tank with integral vapor adsorption of embodiment 36, wherein the adhesive comprises at least one of pressure sensitive adhesives, UV curing adhesives, thermally curing adhesives, hot melt adhesives, reactive multi-part adhesives, acrylic and (meth)acrylic adhesives, acrylate and (meth)acrylate adhesives, epoxy adhesives in one- or two-part formulations, urethane adhesives, and copolymers and combinations thereof.

39. The tank with integral vapor adsorption of embodiment 36, wherein the tank further includes at least one fuel pump(s), fuel sending line(s), fuel return line(s), atmospheric vent line, port(s), valve(s), sensor(s), air inlet(s), open cell foam, baffle(s), bladder(s) and combinations of those.

40. The tank with integral vapor adsorption of embodiment 36, wherein the tank is a fuel tank with a "ship in a bottle" configuration.

41. An onboard refueling vapor recovery apparatus comprising the sorbent material sheet product of embodiment 1.

42. An onboard refueling vapor recovery apparatus comprising the rolled sorbent material sheet product of embodiment 16.

43. An onboard refueling vapor recovery apparatus comprising the vapor adsorbing canister of embodiment 26

44. An onboard refueling vapor recovery apparatus comprising the vapor adsorbing canister of embodiment 31.

45. An onboard refueling vapor recovery apparatus comprising the tank with integral vapor adsorption of embodiment 36.

DESCRIPTION OF DRAWINGS

Not Applicable.

DETAILED DESCRIPTION

Before the present compositions and methods are described, it is to be understood that this invention is not limited to the particular processes, compositions, or methodologies described, as these may vary. It is also to be understood that the terminology used in the description is for the purpose of describing the particular versions or embodiments only, and is not intended to limit the scope of the present invention, which will be limited only by the appended claims. Unless defined otherwise, all technical and scientific terms used herein have the same meaning as commonly understood by one of ordinary skill in the art. Although any methods and materials similar or equivalent to those described herein can be used in the practice or testing of embodiments of the present invention, the preferred methods, devices, and materials are now described. All publications mentioned herein are incorporated by reference in their entirety. Nothing herein is to be construed as an admission that the invention is not entitled to antedate such disclosure by virtue of prior invention.

It must also be noted that as used herein and in the appended claims, the singular forms "a," "an," and "the" include plural reference unless the context clearly dictates otherwise. Thus, for example, reference to "a combustion chamber" is a reference to "one or more combustion chambers" and equivalents thereof known to those skilled in the art, and so forth.

As used herein, the term "about" means plus or minus 10% of the numerical value of the number with which it is being used. Therefore, about 50% means in the range of 45%-55%.

As used herein, the term "sorbent material" is meant to encompass all known materials from any source that are capable of adsorbing liquids and/or gases. For example, sorbent materials include, but are not limited to, activated carbon, natural and synthetic zeolite, silica, silica gel, alumina, zirconia, and diatomaceous earths.

As used herein, the term "may" means that the subsequently listed element may or may not be included in an embodiment. For example, an embodiment that may include a polymer substrate means that the embodiment can include that polymer substrate, but that it is also contemplated that the embodiment can exclude the polymer substrate.

As used herein, descriptions and claims of multiple sorbent material sheets mean that there are multiple, separated sheets, with sides and/or surfaces in proximity to each other. Alternatively, descriptions and claims of multiple sorbent material sheets mean that there is only a single sheet, but that it has been wound or folded over on itself to yield a stacked, wound, or otherwise constructed mass of sheets with sides and/or surfaces in proximity to each other. The term also envisions that multiple sheets are stacked together and then wound or otherwise folded over, forming alternating layers in a single mass.

Embodiments of the invention are directed to devices containing one or more sheets of sorbent material, sorbent material sheets, and methods for making sorbent material sheets and devices containing these sheets. In various embodiments, the sorbent material sheets may be composed of a sorbent material and a binder and have a thickness of less than about 1 mm. The devices of various embodiments may include a housing and one or more of sorbent material sheets. In some embodiments, the devices may have a void fraction of about 10% or more of the total volume of the housing.

The Sorbent Material Sheets

The sorbent material sheets of the invention may include any of the sorbent materials described above including, but are not limited to, activated carbon, natural and synthetic zeolite, silica, silica gel, alumina, zirconia, and diatomaceous earths, and in certain embodiments, the sorbent material sheets may be composed of activated carbon. The sorbents may be used alone or in combination.

The activated carbon may be of various grades and types selected based on performance requirements, cost, and other considerations. The activated carbon may be granular from reagglomerating a powder, granular from crushing or sizing nutshells, wood, coal or pellets created by extrusion, or activated carbon in powdered form. The activated carbon may be formed by processes of carbonization and activated. The raw material, such as wood, nutshell, coal, pitch, etc. is oxidized and devolatized, with steam and/or carbon dioxide gasified to form the pore structure in the activated carbon which is useful for adsorption. The initial oxidation and devolatilization process may include a chemical treatment with a dehydrating chemical, such as phosphoric acid, sulfuric acid, sodium hydroxide, potassium hydroxide, and combinations of those.

A variety of activation processes are known in the art. The most useful processes for providing activated carbon for the sorbent material sheets of the claimed invention involve a step of providing wood and/or wood byproduct, acid treating the wood and/or wood byproducts by exposure to phosphoric acid, and carbonizing the wood and/or wood byproducts using steam and/or carbon dioxide gasification. This process results in activated carbon particles having the highest butane working capacity ("BWC"), which is a measure of activated carbon performance. More details of the BWC testing and results are described in the Examples.

The activated carbon may be formed from materials including bagasse, bamboo, coconut husks, peat, wood such as hardwood and softwood sources in the form of sawdust and scrap, lignite, coal and coal tar, petroleum pitch, asphalt and bitumen, corn stalks and husks, wheat straw, spent grains, rice hulls and husks, nutshells, and combinations thereof.

The sorbent material sheets may further include one or more binders. Embodiments are not limited to particular binders, which can include polytetrafluoroethylenes (PTFE or TEFLON), polyvinylidene fluorides ($PVF_2$ or PVDF), ethylene-propylene-diene (EPDM) rubbers, polyethylene oxides (PEO), UV curable acrylates, UV curable methacrylates, heat curable divinyl ethers, polybutylene terephthalate, acetal or polyoxymethylene resin, fluoroelastomers such as perfluoroelastomers (FFKM) and tetrafluoro ethylene/propylene rubbers (FEPM), aramid polymers such as para-aramid and meta-aramid polymers, poly trimethylene terephthalate, ethylene acrylic elastomers, polyimide, polyamide-imides, polyurethanes, low density and high density polyethylene, polypropylene, biaxially oriented polypropylene (BoPP), polyethylene terephthalate (PET), biaxially oriented polyethylene terephthalate (BoPET), polychloroprene, and copolymers and combinations thereof. The binders can be thermoplastic or thermosetting as conditions require, and can include mixtures of thermoplastic and thermosetting compounds.

The amount of binder may be about 2% to about 30% by weight of the total composition, and in certain embodiments, the amount of binder may be about 2% to about 20% by weight or about 2% to about 10% by weight of the total composition, or any individual amount or range encompassing these example amounts. In some embodiments, the sorbent material sheets may include a solvent, which may generally be present in small, residual, amounts of, for example, less than 10%, less than 5%, or less than 2% and greater than about 0.1% or 0.2% by weight. In particular, in some embodiments the sorbent material sheets may have no (0%) solvent.

In some embodiments, the sorbent material sheets may have a thickness of less than about 1 mm, about 0.01 mm to about 1.0 mm, about 0.02 mm to about 0.90 mm, about 0.05 to about 0.95 mm, about 0.05 to about 0.90 mm or any individual thickness or range encompassed by these example ranges. The sorbent material sheets of various embodiments may have a density of about 0.05 g/cc to about 2.0 g/cc as measured by the particle density test, and in other embodiments, the sorbent material sheets may have a density of 0.08 g/cc to about 1.5 g/cc, about 0.1 g/cc to about 1.3 g/cc as measured by the particle density test, or any density or range encompassed by these example ranges. In some embodiments, the sorbent material sheet may have a resistivity of less than 20 ohm-cm, and in certain embodiments, the sorbent material sheets may have a resistivity of about 10 ohm-cm to about 20 ohm-cm, about 8 ohm-cm to about 18 ohm-cm or any individual resistivity or range encompassed by these example ranges. The BWC for each sorbent material sheet may be greater than about 10 g/100 cc, and in some embodiments, the BWC may be from about 7.0 g/100 cc to about 30 g/100 cc, about 8.0 g/100 cc to about 25 g/100 cc, about 10 g/100 cc to about 20 g/100 cc, about 10 g/100 cc to about 15 g/100 cc, about 11 g/100 cc to about 15 g/100 cc, about 12 g/100 cc to about 15 g/100 cc or any individual BWC or range encompassed by these example ranges. In other examples, the BWC may be about 9 g/100 cc to about 15 g/100 cc, about 12 g/100 cc to about 20 g/100 cc, about 13 g/100 cc to about 20 g/100 cc, about 14 g/100 cc to about 20 g/100 cc, or about 15 g/100 cc to about 20 g/100 cc. It is also contemplated that any of the endpoints of the above ranges may be combined to form new and distinct ranges.

The sorbent material sheets of the present invention have higher performance as measured by the BWC than conventional sorbent materials which are provided in powders or other particulate forms.

The sorbent material sheets of embodiments can be made by any process. In some embodiments, sorbent material sheets can be made by pulverizing granular or pelletized sorbent material to a powder, mixing the powder with a binder to form a mixture, heating and blending the mixture, and rolling the mixture to form the sorbent material sheet. The step of pulverizing may produce sorbent particles having an average particle diameter of about 0.001 mm to about 0.2 mm, about 0.005 mm to about 0.1 mm, about 0.01 mm to about 0.075 mm, or any individual particle diameter or range encompassed by these example ranges, and in certain embodiments, the pulverized sorbent particles may have an average particle diameter of about 0.001 mm to about 0.01 mm. The step of mixing the powder with a binder may include mixing the sorbent particle powder with about 2% to about 20% by weight or about 2% to about 10% by weight of the total composition, or any individual amount or range encompassed by these example ranges. Heating can be carried out at any temperature sufficient to remove residual solvent such as, for example, about 50° C. to about 200° C.

The sorbent material sheet of the invention may include various distributions of different sized particles to increase the packing efficiency of the powder within the sorbent material sheets. The selection of different sized particles can also improve rheological properties of the powder and surrounding binders, which allows improved mixing and uniform particle distribution before formation of the sorbent material sheets. In some embodiments, the particles of the sorbent material sheet may have a single particle size distribution, and in other embodiments, the particles may have two different particle size distributions. In further embodiments, the particle may have at least three different particle size distributions.

The mean particle sizes of the at least two different particle populations, each having a particular size distribution, may be selected so that they have a ratios of between about 1:1 and about 1:15: In other embodiments, the mean particle sizes of the two different particle populations may have a ratio of about 1:2 to about 1:10. The mean particle sizes may also have a ratio of about 1:2 to about 1:5, or combinations of any of the above listed ratios.

The sorbent material sheets have significantly higher sorbent capacity than prior art fuel vapor recovery canisters for a given volume and weight. This capability can be utilized in various ways. In some embodiments, the sorbent material sheets can provide enhanced pollution controls in jurisdictions where such high levels of control are required. In other embodiments, the overall size, cost, and weight of the ORVR can be reduced for a specific level of performance. In further embodiments, an ORVR adsorption device can be designed which has increased performance over conventional adsorption canisters, thereby allowing the designer to omit costly and complex returnless fuel pump systems which would otherwise be required to reduce evaporative emissions. Higher performance adsorption devices may also render active condensing vapor systems unnecessary, which avoids the size, weight, and cost of compressor pumps and condensate storage tanks. It should be understood, however, that the ORVR adsorption device using the sorbent material sheets of the invention can also be combined with these devices for exceptionally high performance and a minimal size, weight, and cost penalty over conventional systems.

The sorbent material sheets may be configured together in a variety of ways depending on the physical space that they must conform to, the required device performance, and the features which are included in proximity to the sheets. In some embodiments, the sheets may be corrugated, include folds, and/or include holes or apertures to increase the surface area of the sorbent material sheets that is exposed to the passing fluid, therefore increasing performance for a given total sheet surface area. The various corrugations, folds, holes, and apertures can also be sized and placed to make way for internal and external features, such as fluid channels, tubing, sensors, and valves. The folds of the sorbent material sheets may take a variety of forms, such as a spiral wrapped configuration in either a cylindrical or elliptical form. The folds may also be in the form of an "S" shape, or a convex or concave "C" shape depending on the required device dimensions and/or any other required internal or external features. The sorbent material sheets may also be stacked in a flat or curved configuration, and the stacked sheets may be square, rectangular, circular, oval, or other irregular shape as needed to fit the space intended. This, in combination with the housing features discussed below, enables devices formed from the sorbent material sheets to fit in smaller, more irregularly shaped spaces than prior art canister devices, which maximizes vehicle interior space.

In addition to the above described configurations, the sorbent material sheets may also have surface features. In some embodiments, the sorbent material sheets may include raised portions, and in other embodiments, the sorbent material sheets may include depressed portions. These surface features may be combined within the same sheet. The inclusion of raised and/or depressed portions in the sheets may be utilized to form various configurations between the sheets as they are stacked, wrapped, and so forth. For instance, the sheets can be aligned so that the raised and/or depressed portions nest with each other, which brings the adjacent sheets closer together. The sheets can also be aligned so that the raised and/or depressed portions do not nest with each other, which forms a gap between the adjacent sheets. The alignment can be used to form various open and closed channels for vapor adsorption between the sheets.

Sorbent Material Sheet Product

The sorbent material sheets described above are combined into a sorbent material sheet product. The combination of the sorbent material sheets takes advantage of one or more of the above described features, such as increased surface area/volume ratio, reduced void space, improved sorbent performance, etc. In general, the individual sorbent material sheets are arranged next to each other to form a sorbent material sheet product that comprises sheets that are stacked, rolled, wound, folded, and/or laminated such that the surfaces of the sorbent material sheets are in close proximity to, or adjacent to each other. Whatever the arrangement, the goal is to maximize the surface area of the sheets exposed to the vapor, fluid, and/or gas stream and thus the performance of the sorbent material sheets.

Stacked Sorbent Material Sheet Product: The stacked sorbent material sheet product of the invention comprises two or more sorbent sheets each defining an upper surface and a lower surface, and having a known combined total surface area, wherein each sorbent sheet comprises a sorbent material and a binder; where adjacent sorbent sheets are stacked and arranged such that adjacent upper and lower surfaces are substantially congruent with each other, and aligned to allow fluid flow at least between adjacent upper and lower surfaces.

This arrangement results in an improved BWC. For example, each individual sorbent material sheet may have a BWC of about 12, and the stacked sorbent sheet media has a BWC that is at least about 1-10%, at least about 5-15%, at least about 2-20%, at least about 5-10%, or at least about 7% higher than the sum of the BWC of the individual sheets. The sorbent sheet media of claim 1 wherein the stacked sorbent sheet product has a BWC at least about 5% higher than the BWC of an unstacked sheet having the same known surface area.

Performance improvements of the stacked sorbent material sheet product of the invention can also be measured as the performance of the product having a given amount of activated carbon versus the performance of that same amount and grade of activated carbon if provided within a canister in a pelletized or powdered form. In some embodiments, the stacked sorbent sheet product has a BWC that is about 3% higher, about 5% higher, about 7% higher, about 9% higher, about 10% higher, about 12% higher, about 14% higher, and about 16% higher than the same amount and grade of activated carbon within a canister in pelletized or powdered form. Ranges based on these amounts are also contemplated, such as performance that is between about 5-14% higher, between about 5-10% higher, between about 10-16% higher, and so forth.

It should be noted that these improvements are only measured as between the weights of the pelletized or powdered activated carbon and the stacked sorbent material sheet product, without accounting for other improvements of the stacked sorbent material sheet product. One key difference, described above, is the omission of a rigid canister body that would otherwise be required. The omission of the rigid canister body, which is needed in prior art systems involving pelletized or powdered activated carbon because the loose activated carbon cannot support itself, drives further weight savings and therefore even further performance for a given weight.

The stacked sorbent sheet product has a BWC at least 10% higher than the BWC of a pelletized/powdered form of the same amount by weight of the sorbent material in the sorbent sheet. The stacked sorbent sheet product has a butane working capacity greater than about 10 g/100 cc. The stacked sorbent sheet product has a butane working capacity of about 7.0 g/100 cc to about 30 g/100 cc, or greater than about 12 g/100 cc, or greater than about 13 g/100 cc, or greater than about 14 g/100 cc, or greater than about 15 g/100 cc, or greater than 20 g/100 cc. Ranges are also contemplated, such as about 10-20 g/cc, about 10-12 g/cc, about 10-14 g/cc, about 12-14 g/cc, about 12-15 g/cc, and about 15-20 g/cc.

In some embodiments, the stacked sheets are held in a spaced apart relationship which controls one or more of void volume, flow rate, pressure drop, and other characteristics. Such spacing is achieved in some embodiments where at least one of the two or more sorbent material sheets is corrugated. The spacing can also be achieved with various folds in the sheets, and can also be achieved by the corresponding raised and/or depressed portions of the sheets which are aligned to form gaps between the sheet. If the sheets are arranged deliberately so that the raised and/or depressed portions of the sheets do not nest between sheets, this results in additional spacing between the sheets and permits fluid flow in those portions. If the sheets are arranged deliberately so that at least some raised and/or depressed portions nest between sheets, this results in a tighter fitting stack of sheets and decreases the spacing between the sheets, with a corresponding decrease or even stop in fluid flow. Combinations of these features can be used to form stacked sorbent sheet products with directed regions or channels for fluid flow and barriers or edge seals to prevent fluid leakage. These features for fluid flow can also include holes, cuts, or apertures through one or more of the sheets in the stacked sorbent sheet product.

Each sorbent sheet defines opposed lateral edges which are substantially parallel to fluid flow. The congruent lateral edges of adjacent sorbent sheets may be separate from each other, bound together or some combination thereof. In this manner, the edges of the stacked sorbent material sheet product may be sealed, partially sealed, or unsealed. The sealed or unsealed nature can be chosen to achieve desired results such as modifying fluid flow rate and/or patterns or other properties.

In some embodiments, the stacked sorbent material product yields a void volume of about 10% or less. In some embodiments, the void volume is about 8% or less, in some embodiments, the void volume is about 6% or less, in some embodiments, the void volume is about 4% or less.

In some embodiments, each sorbent sheet has a density of about 0.08 g/cc to about 1.5 g/cc.

In some instances, the sorbent material sheet product comprises at least two populations of sorbent material particles, wherein each of the at least two populations have different average particle diameters. See the above description of the bimodal particle size distribution which was discussed with respect to the individual sorbent material sheets. The same distribution ratios as between populations of sorbent particles are contemplated with respect to product formed of multiple sorbent material sheets. In some instances, the density of the sorbent material particles achieved by the at least two populations is greater than the density achieved by either population alone. The inclusion of a bimodal particle size distribution can also be used to improve the mechanical properties of the sorbent material sheet product because it makes the polymeric sheets much more resistant to shear forces.

In some instances, a sorbent material sheet product comprises at least two sorbent material sheets, each of which has a defined upper surface and lower surface which have a combined total surface area, and wherein each sorbent material sheet comprises a sorbent material and a binder, and wherein each sorbent material sheet is stacked and arranged such that adjacent upper and lower surfaces of the separate sheets are substantially parallel and are aligned to allow fluid flow at least between the adjacent upper and lower surfaces.

The sorbent material sheet product may have a BWC stacking multiplier ratio of about 2.0, wherein the BWC stacking multiplier ratio is defined by the formula:

BWC stacking multiplier ratio=[(measured BWC of entire sorbent material sheet product)/(measured BWC of individual sorbent material sheet outside of product)]/number of sorbent material sheets in the sorbent material sheet product.

The BWC stacking multiplier ratio may be at least about 1.0, at least about 1.1, at least about 1.2, at least about 1.3, at least about 1.4, at least about 1.5, at least about 1.6, at least about 1.7, at least about 1.8, at least about 1.9, at least about 2.0, at least about 2.1, at least about 2.2, at least about 2.3, at least about 2.4, at least about 2.5, at least about 2.6, at least about 2.7, at least about 2.8, at least about 2.9, and at least about 3.0. Additionally, endpoints can be combined, for instance about 1.0-1.5, about 1.1-1.2, about 1.1-1.3, about 1.5-2.0, about 2.0-2.5, and about 2.5-3.0.

The sorbent material sheet product of claim 1, wherein the sorbent material sheet product has a BWC value about 5%, about 10%, about 15%, about 20%, about 25%, about 30%, about 35%, about 40%, about 45%, and about 50% higher than the BWC of the same weight of sorbent material in pelletized or powdered forms. These can also be combined to formed ranges, for example, between about 5-25% higher. The invention also contemplates that these amounts are the endpoints on ranges, such as at least about 40% higher.

The sorbent material sheets in the sorbent material sheet product, may be configured as being flat, wound in a spiral cylinder, wound in an elliptical form, wound in an elongate rectangular bar, folded, laminated in an "S" shape, formed as concentric cylinders, formed as concentric ellipses, formed as a concentric rectangular bar, or as combinations of these forms.

In some embodiments, the sorbent material sheet product will comprise a single sorbent material sheet that is wound or rolled to achieve the desired characteristics including, but not limited to density, void space, pressure drop, etc.

Wound/Rolled Sorbent Material Sheet Product:

The sorbent material sheet product can also be wound or rolled as an alternative or in combination with stacked embodiments. A wound or rolled sorbent material sheet product comprises a sorbent sheet defining an upper surface and a lower surface, and combined has a known total surface area, wherein the sorbent sheet comprises a sorbent material and a binder where the sorbent sheet is spiral wound to create adjacent sheet layers which allow fluid flow around and between adjacent sheet layers.

Similar to the stacked sheet arrangement, the rolled sorbent sheet product has improved performance over the sorbent material sheets alone, and has improved performance over the equivalent weight of activated carbon that is provided in pelletized or powdered form.

The rolled arrangement results in an improved BWC for a given sheet area versus the same area for individual sheets that are not rolled. For example, each individual sorbent material sheet may have a BWC of about 12, and the rolled sorbent sheet media has a BWC that is at least about 1-10%, at least about 5-15%, at least about 2-20%, at least about 5-10%, at least about 5%, or at least about 7% higher than the sum of the BWC of the individual sheets.

Performance improvements of the rolled sorbent material sheet product of the invention can also be measured as the performance of the product having a given amount of activated carbon versus the performance of that same amount and grade of activated carbon if provided within a canister in a pelletized or powdered form. In some embodiments, the rolled sorbent sheet product has a BWC that is about 3% higher, about 5% higher, about 7% higher, about 9% higher, about 10% higher, about 12% higher, about 14% higher, and about 16% higher than the same amount and grade of activated carbon within a canister in pelletized or powdered form. Ranges based on these amounts are also contemplated, such as performance that is between about 5-14% higher, between about 5-10% higher, between about 10-16% higher, and so forth.

The rolled sorbent sheet product has a BWC at least 10% higher than the BWC of a pelletized/powdered form of the same amount by weight of the sorbent material in the sorbent sheet. The stacked sorbent sheet product has a butane working capacity greater than about 10 g/100 cc. The stacked sorbent sheet product has a butane working capacity of about 7.0 g/100 cc to about 30 g/100 cc, or greater than about 12 g/100 cc, or greater than about 13 g/100 cc, or greater than about 14 g/100 cc, or greater than about 15 g/100 cc, or greater than about 20 g/100 cc. Ranges are also contemplated, such as about 10-20 g/cc, about 10-12 g/cc, about 10-14 g/cc, about 12-14 g/cc, about 12-15 g/cc, and about 15-20 g/cc.

A rolled sorbent sheet product as described herein has a generally cylindrical shape having a length substantially greater than its diameter, although any dimension can be employed, including conical, or frustro-conical variations, as well as ellipsoids, or other shapes.

The density of the rolled sorbent sheet product may be computed based on the formulas below:

Roll Density Calculations (US units)

$BW$: Basis Weight $\left(\frac{oz}{yd^2}\right)$     $L$: Length on Roll (yd)

$OD$: Outer Roll Diameter (in)     $ID$: $\frac{\text{Inner Roll Diameter}}{\text{Core Diameter (in)}}$ $W$: Machine width or roll length (in)     $\rho$: Roll Density $\left(\frac{lb}{ft^2}\right)$ $$\rho\left(\frac{lb}{ft^2}\right) = (3) * \frac{BW * L}{\left(\frac{OD^2}{4} - \frac{ID^2}{4}\right) * \pi}$$

Roll Density Calculations (SI units)

$BW$: Basis Weight $\left(\frac{g}{m^2}\right)$     $L$: Length on Roll (m)

$OD$: Outer Roll Diameter (mm)     $ID$: $\frac{\text{Inner Roll Diameter}}{\text{Core Diameter (mm)}}$ $W$: Machine width or roll length (mm)     $\rho$: Roll Density $\left(\frac{kg}{m^2}\right)$ $$\rho\left(\frac{kg}{m^2}\right) = (1000) * \frac{BW * L}{\left(\frac{OD^2}{4} - \frac{ID^2}{4}\right) * \pi}$$

The rolled sorbent sheet product may be wound to an average roll density of about 80-1500 kg/m³, about 500-2000 kg/m³, about 750-1500 kg/m³, about 900-1200 kg/m³, about 900-1050 kg/m³, about 400-500 kg/m³, about 500-600 kg/m³, about 500-550 kg/m³, about 600-650 kg/m³, about 650-700 kg/m³, and about 700-750 kg/m³.

The rolled sorbent sheet product has a butane working capacity greater than about 10 g/100 cc. In some embodiments, the rolled sorbent sheet product has a butane working capacity of about 7.0 g/100 cc to about 30 g/100 cc. The rolled sorbent sheet product may also have butane working capacities that are the same as the above described sorbent sheet products which are not rolled.

Similar to the discussion above with respect to the stacked sorbent material sheets, the wound or rolled sorbent material sheets may include multiple particle size distributions or populations of the adsorbent pelletized or powdered activated carbon. The same ratios are contemplated as discussed above. Similar to the discussion above, this results in greater performance because it enables a larger amount of the activated carbon to be incorporated into the sheets which are formed into the rolled sorbent sheet product.

As used herein, wound or rolled sorbent sheet products refer to any form of layering of one or more sorbent material sheets by winding, spiral winding, concentric layering of tubular (of any cross-sectional shape, e.g. round, elliptical, square, triangular, rectangle, etc.) or combination thereof. For example, a single sorbent material sheet may be spiral wound along its length to form a cylindrical-shaped rolled sorbent material sheet product. As another example, a plurality of sorbent material sheets can be stacked and then wound together to form a similar cylindrical shape. As another alternative, several sheets each formed into a cylinder having a slightly different diameter from the next can be arranged such that they from concentric rings in cross-section of a similarly sized cylinder. Various combinations of these and other arrangements may be used to fill the space within any shape of housing or canister, as described elsewhere herein.

As noted above with respect to the sorbent material sheets, the binder is selected from polytetrafluoroethylenes (PTFE or TEFLON), polyvinylidene fluorides (PVF2 or PVDF), ethylene-propylene-diene (EPDM) rubbers, polyethylene oxides (PEO), UV curable acrylates, UV curable methacrylates, heat curable divinyl ethers, polybutylene terephthalate, acetal or polyoxymethylene resin, fluoroelastomers, perfluoroelastomers (FFKM) and/or tetrafluoro ethylene/propylene rubbers (FEPM), aramid polymers, para-aramid polymers, meta-aramid polymers, poly trimethylene terephthalate, ethylene acrylic elastomers, polyimide, polyamide-imides, polyurethanes, low density and high density polyethylene, polypropylene, biaxially oriented polypropylene (BoPP), polyethylene terephthalate (PET), biaxially oriented polyethylene terephthalate (BoPET), polychloroprene, and copolymers and combinations thereof.

The Housing

The invention also contemplates the use of a housing which partially or totally encapsulates the sorbent material sheets. The housing may be configured in a variety of shapes, for example tetrahedrons, cubes and cuboidal shapes, cylinders, spheres, hyperboloids of a single sheet, conical shapes, ellipsoidal shapes, rectangular shapes, hyperbolic paraboloid shapes, elongate bar shapes, paraboloids, and combinations of these shapes. The combinations may be selected to have different sections each of which have different shapes or portions of different shapes. The housing may also include sections which are separated and are connected by an additional part, for instance, at least one hose or tube which is designed to transfer fuel vapors as needed, or a thin portion of housing that contains the sorbent material sheets. The housing may also be configured with no shape, for example as a flexible bag or pouch containing the sorbent material sheets.

One major advantage of the invention is that the use of the sorbent material sheets are both flexible and self-supporting and can be laminated, rolled, wound, folded, or stacked in a variety of configurations within the housing to suit different mechanical requirements within the tight confines of a vehicle. In such embodiments, the housing would be designed to conform or fit the spaces that are available for the device to be stored. For instance, the housing can be sized and shaped to fit in spaces within or surrounding wheel wells, driveshafts, batteries for hybrid powertrains, spare tires, tire changing tools, tire patching tools, vehicle trunks or other storage spaces, vehicle bumpers and bodywork panels, exhaust systems, other emissions control equipment such as urea or other injection tanks, fuel lines, vehicle frames, suspension components, engine compartment, under passenger compartment seats, within passenger compartment seats, and other spaces which are too small or too difficult to reach to be effectively utilized for passenger or cargo space.

To further reduce weight and size and take advantage of the self-supporting sorbent material sheets, the housing can be in the form of a thin walled bag or pouch. This is possible because the sorbent material sheets have some mechanical structure and are self-supporting and so do not require a rigid outer container as in conventional canisters. The film materials that form the bag can have thicknesses of about 10 µm to about 250 µm. In other embodiments, the bag film can have thicknesses of about 20 µm to about 175 µm, and the bag film can have thicknesses of about 50 µm to about 125 µm.

The bag or pouch may be formed of any materials which are used in fuel systems, and particularly are formed of materials which are designed to withstand the chemical effects of the fuel vapors contained. Bag materials include polytetrafluoroethylenes (PTFE or TEFLON), polyvinylidene fluorides ($PVF_2$ or PVDF), ethylene-propylene-diene (EPDM) rubbers, polyethylene oxides (PEO), UV curable acrylates, UV curable methacrylates, heat curable divinyl ethers, polybutylene terephthalate, acetal or polyoxymethylene resin, fluoroelastomers such as perfluoroelastomers (FFKM) and tetrafluoro ethylene/propylene rubbers (FEPM), aramid polymers such as para-aramid and meta-aramid polymers, poly trimethylene terephthalate, ethylene acrylic elastomers, polyimide, polyamide-imides, polyurethanes, low density and high density polyethylene, polypropylene, biaxially oriented polypropylene (BoPP), polyethylene terephthalate (PET), biaxially oriented polyethylene terephthalate (BoPET), polychloroprene, and copolymers and combinations thereof. The bag is typically thermoplastic for flexibility, but can also be a combination with amounts of thermoset or can be in the form of a cured rubber or an elastomer.

The housing, bag, or pouch may also be designed to act as a vapor barrier to the adsorbed fuel vapors contained therein. This barrier property may be inherent to the polymer itself, or may be achieved through the use of at least one barrier additive and/or at least one barrier layer. Examples of barrier additives which can be formed as a layer or as a particulate filler include polymers such as epoxy, polyamide, polyamide imides, fluoropolymers, fluororubbers, and combinations of those. Barrier layers can also be made of metals such as aluminum, steel, titanium, and alloys of those. The metal barrier layers can be formed by conventional mechanical means, such as coextrusion or adhering with the other layers of the housing, or they can be chemically deposited, such as by chemical vapor deposition or electroplating. The metal barrier layer can be formed from a foil having a thickness of less than about 25 µm, less than about 20 µm, less than about 15 µm, less than about 10 µm, or less than about 5 µm.

The housing and its materials may also be selected to be compatible with "ship in a bottle" fuel systems. In such systems, many or all of the fuel system components, including the fuel pumps, ORVR, fuel filters, valves, and other components are fitted within the vehicle fuel tank. Such systems are advantageous because they reduce assembly time and the amount of space required by the fuel system. In such systems, the housing should have materials which are capable of being immersed in the selected fuel, typically gasoline, for extended periods of time within the vehicle fuel tank, while also being able to withstand the effects of the adsorbed fuel vapors within.

The housing may also be a thin metal housing. The thin metal housing can be formed of flexible or rigid metals such as steel, aluminum, titanium, and alloys of those. The metal housing can be formed from a foil having a thickness of about 5-100 µm, or about 10-250 µm. In some embodiments, the foil may be as thick as about 1 mm. Whether the housing is flexible or rigid depends on the selection of the material, the thickness, and any treatments that have been applied to the metals, such as heat treatments or hot or cold working.

In some embodiments, the housing for the sorbent material sheets may be omitted entirely, with the sorbent material sheets being contained within the fuel tank itself. In such configurations, the sorbent materials sheets can be attached to a portion of the interior of the fuel tank that does not regularly come in contact with liquid fuel and which is free to adsorb fuel vapors. This portion is typically the top or sides of the fuel tank, or combinations of those. The fuel tank may also include a recessed portion on the top or the sides which is designed to include the sorbent material sheets and allow the sorbent material sheets to adsorb fuel vapors. Such embodiments where sorbent material sheets are attached to the interior portions of the fuel tank not only offer maximum space savings and weight savings by omitting the canister structure, but also simplify manufacturing and installation because the sheets are already installed within the fuel tank during vehicle assembly.

The housing can also be eliminated by forming a rolled or folded sorbent sheet and then selectively curing the outer sheets so that they form a durable, cured shell that acts as a support for the rolled or folded sorbent sheets within. Such selective curing can be accomplished thermally or with a chemical bath, or via actinic radiation, such as ultraviolet light or by electron beam curing.

In embodiments where the sorbent material sheets omit the housing and are contained within the vehicle fuel tank itself, the sorbent material sheets may be attached to the fuel tank in a variety of ways. The sorbent material sheets can be fastened using mechanical fasteners such as screws, rivets, or clamps, or the sorbent material sheets may be fastened using an adhesive backing positioned between the fuel tank wall and the sorbent material sheets. The adhesive backing may be a single layer of adhesive or a double sided adhesive tape or sheet. The adhesive used in the adhesive backing may include pressure sensitive adhesives, UV curing adhesives, thermally curing adhesives, hot melt adhesives, and reactive multi-part adhesives. Adhesive compositions include acrylic and (meth)acrylic, acrylate and (meth)acrylate, epoxies in one- and two-part formulations, and urethane.

The sorbent material sheets may be applied during manufacturing in a variety of ways. In some embodiments, the fuel tank may be formed and the sorbent material sheets are applied in a separate step where the adhesive is applied followed by the application of the sorbent material sheets. In other embodiments, the sorbent material sheets are placed, with or without an adhesive backing as appropriate, on the inside of a mold and the fuel tank is injected or blow molded around the sorbent material sheets. In other embodiments, the sorbent material sheets may be coextruded with panels of material which make up the sides of the fuel tank, and the edges of those panels are adhered or welded together to seal the final tank with the sorbent material sheets on the inside.

When the sorbent material sheets are contained within the vehicle fuel tank without the housing, the fuel tank may include additional valves and ports to accommodate the adsorption and desorption of fuel vapors in the fuel tank. For example, during engine operation, air may be introduced into the fuel tank to desorb the fuel vapors which are contained in the sorbent material sheets, as well as those which are present in the tank. These desorbed fuel vapors are then sent to the engine for combustion during optimal cycles as required by the ECU.

When the sorbent material sheets are provided without a housing and are contained within a tank, such as a vehicle fuel tank, they may be positioned so that they are not regularly immersed in the volatile liquids typically contained within the tank. This ensures that the sorbent material sheets do not become prematurely saturated, and also ensures that sufficient surface area is exposed to the vapors within the fuel tank to effect the adsorption of the vapors. The feature contemplates that the sorbent material sheets can be placed in parts of the tank that are unfilled, such as the ullage or headspace of the tank, or near baffles which prevent the sloshing of liquids on the sorbent material sheets. The sorbent material sheets may also be places in a dedicated portion of the tank, such as a small chamber or niche, where the liquids cannot enter.

The devices of various embodiments may include a housing and the sorbent material sheets described above. The housing may be any shape and can be configured for purifying gasses or liquids. For example, in some embodiments, the housing may be any shape such as, for example, cuboidal, cubic, or cylindrical. The sorbent material sheets may be sized to fit within the housing and substantially fill a space within the housing through which the gas or liquid is passed. In some embodiments, two or more sorbent material sheets may be stacked to substantially fill the housing, and in other embodiments, the sorbent material sheets may be rolled to form a spiral wound sheet or pressed to form a stacked sheet. In some embodiments, the stacked or pressed sheets may be such that the sides of adjoining sheets are substantially contiguous. In other embodiments, stacked or pressed sheets may be positioned such that adjoining sheets are spaced. For example, in certain embodiments, the sheets may be corrugated, having sorbent material sheets that form a series or parallel ridges and furrows, and in some embodiments, corrugated sorbent material sheets may be separated by flat sorbent material sheets. The corrugated sorbent material sheets may be disposed within the housing in a stacked or rolled/spiral wound form.

In various embodiments, the void fraction may be about 30% to about 32% less than the void volume for current devices, and in some embodiments, the void fraction may be less than 10%. For example, the devices may have a void fraction of about 45% to about 2%, about 35% to about 5%, about 25% to about 7%, or any individual void fraction or range encompassed by these example ranges. The devices of various embodiments may exhibit less flow restriction, e.g. pressure drop, than devices having granular or pelleted sorbent materials. Thus, more adsorbent material can be incorporated into such devices without reducing the flow rate of the device.

The devices of such embodiments may have butane working capacities ("BWC") of greater than about 5.0 g/100 cc, and in some embodiments, the devices may have a BWC of about 4.0 g/100 cc to about 20 g/100 cc, 5.0 g/100 cc to about 18 g/100 cc, about 7.0 g/100 cc to about 16 g/100 cc, or about 8.0 g/100 cc to about 15 g/100 cc, or any individual BWC or range encompassed by these example ranges. The devices may exhibit a pressure drop that is at most equal to a conventional dense pack bed of powders, pellets, or granules of activated carbon or other activated compounds. This feature is advantageous because it ensures that the inventive sorbent material sheet product, whether stacked, rolled, wound, or otherwise configured, still has the same ability to process and transfer vapors and gases as conventional devices, despite the increased sorbent performance.

When the sorbent material product, stacked or rolled, is combined with a housing, it is useful as a vapor loss canister or other device. As noted above, the shapes and properties achieved via the stacked or rolled products allow for unique placement and improved performance.

In accordance with some embodiments, a vapor loss canister comprises a housing having at least one sidewall defining an internal space, a sorbent sheet product, such that the sorbent sheet media is sized and configured to fit within the housing and fill substantially the entire internal space within the housing, wherein the internal space is substantially free of additional internal material other than the sorbent sheet media. That is, traditional vapor loss canisters require springs, filters, support substrates, etc. to hold and maintain the loose carbon powder or pellets. Because the sorbent sheets are substantially self-supporting, these additional support structure are not needed. This allows for the inclusion of more material or the use of a smaller canister without sacrificing performance.

In some embodiments, the sorbent sheet product comprises a stacked sorbent sheet media comprising as described above. In such instances, the housing or canister can take any shape as discussed above, but in some embodiments, is relatively flat and flexible for housing stacked sorbent sheet media that has a height substantially less than its length or width. In these instances, the housing may be a flexible bag or pouch, as discussed above.

In some instances the canister is adapted for placement atop or even within a fuel tank.

In some embodiments, sorbent sheet material product comprises a rolled sorbent sheet product as described above. In some instances, at least a portion of the housing sidewall defines a filter substantially without occupying any internal canister space.

In some embodiments, a fuel tank may be provided with integral vapor adsorption. Such tanks comprise a tank structure, and at least one sorbent sheet material product, either stacked or rolled, at least one fastening device which fastens the sorbent material product to a surface of the tank that is not regularly immersed in the volatile liquids contained within the tank. The fastening device may be an adhesive layer which is formed between one surface of the sorbent material product and a wall of the tank.

Such adhesive may be at least one of pressure sensitive adhesives, UV curing adhesives, thermally curing adhesives, hot melt adhesives, reactive multi-part adhesives, acrylic and (meth)acrylic adhesives, acrylate and (meth)acrylate adhesives, epoxies adhesives in one- and two-part formulations, urethane adhesives, and copolymers and combinations thereof.

The tank may further include one or more of at least one fuel pump(s), fuel sending line(s), fuel return line(s), atmospheric vent line, port(s), valve(s), sensor(s), air inlet(s), open cell foam, baffle(s), bladder(s) and combinations of those.

In some embodiments, the tank is a fuel tank with a "ship in a bottle" configuration.

Some embodiments provide an onboard refueling vapor recovery apparatus comprising the sorbent material sheet product as described herein. The onboard refueling vapor recovery apparatus may include a vapor adsorbing canister as described herein. The onboard refueling vapor recovery apparatus may include a tank with integral vapor adsorption of claim 22.

Additional Components

The invention may include sensors such as a fuel composition sensor. The fuel composition sensor may be used to detect the mixture of gasoline and ethanol contained within the housing and the sorbent material, and this information may be communicated to the ECU so that vapors which are later released to the engine can be more precisely used during engine combustion. Other sensors include temperature sensors, vapor pressure sensors, oxygen sensors, and the like. The sensors can operate on principles of electrochemical interaction, electronic such as thermocouples, electromechanical, refractive index, infrared spectroscopy, and others depending on the type of information that is required for the ECU. The sensors can be included alone or in combination within the housing, or, if no housing is specified, within the area that contains the sorbent materials sheets. The sensors can be included in holes or notches which are cut from the sheet, or in spaces between the sheets with the sheets wrapped or folded around the sensors.

The invention may include inlets, outlets, hoses, and associated valves to control the flow of fuel vapor to and from the sorbent materials of the invention. The openings may static or they may have valves that are opened and closed as required by the ECU to control the flow of vapor into and out of the sorbent sheets of the invention. For example, during refueling, outlet valves remain closed to ensure that displaced fuel vapors do not escape into the atmosphere. However, when the engine operates and the ECU requests it, at least one outlet valve may open to allow the release of adsorbed vapor into the engine to allow its combustion. There may also be included a vent and valve to the atmosphere in case there is too much fuel vapor for the sorbent material sheets of the invention to safely adsorb. There may further be included an inlet and valve for air or other gases, such as inert exhaust gases, which is used to desorb the fuel vapor as it is being sent to the engine for combustion.

The invention also contemplates the inclusion of and integration with other components which make up ORVR systems and devices. These other components may include active compressors and condensers, fuel tank heaters, fuel tank heat exchanging coils for cooling enclosed fuels, fuel filler necks, fuel filler ports, including capless fuel filler ports, vents for fuel vapors, fuel lines for sending fuel, fuel return lines, vents and vehicle rollover valves, fuel pumps, and air intake or purge valves.

The invention further contemplates devices and structures which may be combined with the sorbent material sheets to improve or control the adsorption and desorption of fluids and gases. For example, fans or pumps may be included to force the fluids or vapors over the sorbent material sheets as they are assembled, allowing the sorbent material sheets to be packed or wound tighter or allowing larger devices than would otherwise be possible with the same amount of fluid diffusion over the sheets. Alternatively, the devices can include resistance element heaters, or Peltier effect heaters or coolers which are designed to heat and/or cool the fluids and thus force their movement over the sorbent material sheets of the claimed invention. For instance, heated, expanding fluid may vent upwards and draw in more fluid at the bottom of a rolled or wound article that is oriented vertically to take advantage of the effects of gravity.

Other Uses

In addition to automotive uses, the inventors contemplate that the sorbent sheets of the claimed invention can be used in any instance where a tank or other enclosed space is designed to contain volatile liquids, in particular volatile hydrocarbons such as fuels, solvents, and other volatile compounds. Examples include but are not limited to fuel tanks in aircraft, fuel tanks in ships and other marine vehicles, fuel tanks in trucks, chemical tanks in railroad cars, barges, ships, trucks, vehicles, and other bulk carriers, and stationary chemical tanks. The sorbent material sheets of the claimed invention can also be attached or adhered to the walls of confined spaces where the presence of volatile compounds would be detrimental, for example, in chemical facilities where operators and maintenance staff must periodically access the space. Such sorbent material sheets, when used in such combined spaces, can not only increase safety for operators and maintenance staff, but they can also reduce the need for cumbersome protective gear.

In some embodiments, the devices may not filter microscopic particles, and therefore will have utility outside the fuel vapor recovery arena. Devices containing granular or pelleted sorbent materials filter particles that are larger than about 1% of their diameter thereby removing these particles from gases or liquids that are treated using the device. Because devices containing stacked or rolled/spiral wound sorbent material sheets allow such particles to pass through without filtering, the devices of various embodiments may be useful for filtering biological fluids such as blood, where red and white blood cells and platelets and the like must pass through the filter without being physically filtered out of the blood. Other contaminates may be adsorbed onto the sorbent material sheets and removed from the blood filtrate

EXAMPLES

Although the present invention has been described in considerable detail with reference to certain preferred embodiments thereof, other versions are possible. Therefore the spirit and scope of the appended claims should not be limited to the description and the preferred versions contained within this specification. Various aspects of the present invention will be illustrated with reference to the following non-limiting examples.

As was discussed above, BWC is a measure of the performance of activated carbon. BWC is determined for a sample by measuring the ability of the activated carbon to adsorb and desorb butane from dry air under specified conditions, and measures the difference between the butane adsorbed at saturated and the butane retained per unit volume of carbon after a specified purge. BWC can be tested in several ways, including procedures specified by ASTM International and which are known to those of skill in the art. Specifically, testing can follow ASTM D5228, which includes revisions D5228-16, D5228-92(2015), D5228-92 (2005), and D5228-92(2000).

In Examples 1-4, the carbon sheets were spiral wound to yield 10% void fraction, which give about a 30% performance improvement over the activated carbon ("PAC") alone. The void fraction of comparative granular or powdered beds of activated carbon, similar to Comparative Example 1, was approximately 40% void fraction by volume. The Examples and Comparative Example are described below.

Example 1

Activated carbon films were made from CPL (CT #14299-8), which is an activated carbon that is wood based and which is activated using phosphoric acid. Films were also made from CPW (CT #14299-10), which is an activated carbon that is wood based and which is activated using phosphoric acid. The activated carbons were pulverized in a mechanical mortar and pestle and mixed with 9% PTFE powder. The resulting composition had a bread dough-like consistency. The composition was rolled to form sheets having thicknesses of 0.448 mm (CT #14299-8 1), 0.411 mm (CT #14299-8 2), 0.459 mm (CT #14299-10 1), and 0.439 mm (CT #14299-10 2).

Example 2

Activated carbon sheets were prepared as described in Example 1 using BVC-11 8×25 activated carbon, which is a nutshell based activated carbon that is activated with phosphoric acid. This formed sample CT #14266-1. A sample was also formed with BVC-11 8×35, which is also a nutshell based activated carbon that is activated with phosphoric acid. This formed sample CT #14266-2. The formed sheets had a thickness of 0.330 mm (CT #14266-1 1), 0.334 mm (CT #14266-1 2), 0.327 mm (CT #14266-1 3), 0.317 mm (CT #14266-2 1), 0.307 mm (CT #14266-2 2), and 0.328 mm (CT #14266-2 3).

Butane Working Test—Examples 1 and 2

Activated carbon sheets prepared in Examples 1 and 2 were tested for butane adsorption using the butane working test. In this test, the sheets were rolled and placed in tubes. Butane was added to the tubes and butane adsorption was measured. The Tactic experiments, used to predict the BWC performance, were run on small stacks of 5 slat sheets. Results are illustrated in TABLES 1 and 2:

TABLE 1

| (Example 2) | | |
|---|---|---|
|  | 14266-1 | 14266-2 |
| Tube vol. (cc) | 3.8465 | 3.8465 |
| Sheet wt. (g) | 6.3604 | 6.0009 |
| Sheet thick. (cm) | 0.033 | 0.0315 |
| Sheet vol. (cc) | 11.22 | 10.71 |
| Sheet dens. (g/cc) | 0.566881 | 0.566881 |
| BWC sheet measured (g/100 cc) | 16.1 | 14.14 |
| BWC sheet tactic predicted (g/100 cc) | 16.48 | 15.59 |
| BWC PAC measured (g/100 cc) | 12.10 | 12.20 |
| BWC PAC tactic (g/100 cc) | 11.98 | 12.31 |

TABLE 2

| (Example 1) | | |
|---|---|---|
|  | CT-14299-8 | CT-14299-10 |
| Tube vol. (cc) | 16.504 | 16.504 |
| Sheet wt. (g) | 4.10 | 3.16 |
| Sheet thick. (cm) | 0.411 | 0.439 |
| Sheet vol. (cc) | 9.92 | 7.90 |
| Sheet dens. (g/cc) | 0.413 | 0.404 |
| BWC sheet measured (g/100 cc) | 12.32 | 12.41 |
| BWC sheet tactic predicted (g/100 cc) | 12.22 | 12.93 |
| BWC PAC measured (g/100 cc) | 7.9 | 9.6 |
| BWC PAC tactic (g/100 cc) | 9.59 | 8.89 |

Example 3

Activated carbon sheets were prepared as in Examples 1 and 2, but using granular activated carbon #3445-32-4. The activated carbon sheets were also not rolled as tightly as in prior Examples 1 and 2, which The resultant sheets were tested for butane adsorption using the butane working capacity test. In these two tests, two separate stacks of 20 sheets of 0.45 mm thickness were cut in rectangles of 2.2 cm×7.5 cm±10%, sealed at the side edge with double sided tape of 0.05 mm thickness and 2 mm width. In this configuration, tape thickness defined the average sheet spacing. Total height of each of the stacks of 20 sheets with tape spacers was 1 cm. These stacks of sheets were then placed in large 2.54 cm diameter cylindrical glass tubes for butane adsorption/desorption testing. The excess volume between the rectangular stack of sheets and the walls of the cylindrical glass tube were filled with closed cell expanded foam to take up the excess volume and sealed to avoid bypass gas flow past the inserted test samples. The butane or air was forced to flow in the 0.05 mm gaps between the 20 sheets. The flow rate and volume of the stacks of sheets was selected to maintain ASTM working capacity procedure. The ASTM procedure was followed with the exception of the use of the stack of sheets rather than a granule bed, the use of the closed cell expanded foam for sealing, and the required larger cylindrical glass tube arrangement to accommodate the rectangular stack of sheets.

During the modified ASTM procedure, butane or air was forced to flow in the 0.05 mm gaps between the 20 sheets, with the flow rate and volume of the stacks of sheets kept to ASTM specifications for working capacity. The results of Example 3 are in Table 3 below.

Comparative Example 1

A comparative example was also prepared using the same granular activated carbon #3445-32-4 as in Example 4, but without forming the granular activated carbon as part of a sheet or roll. The granulated activated carbon was tested per ASTM procedure. The results of this test are in Table 3 below.

TABLE 3

(Example 3 and Comparative Example 1)

| | Granular activated carbon (Comparative Example 1) #3445-32-4 | Stacked 0.45 mm sheets (Example 3) | |
|---|---|---|---|
| | | #3445-32-4- stack 1 | #3445-32-4- stack 2 |
| Tube vol. minus foam volume if present (cc) | 16.7 | 16.4 | 15.5 |
| Carbon wt. (g) | 6.513 | 7.885 | 7.465 |
| Sheet thickness (cm) | — | .045 | 0.045 |
| Granular bed or Stacked sheet vol. (cc) | 16.7 | 16.4 | 15.5 |
| Granular bed or individual Sheet density (g/cc) | 0.389 | .534 | .534 |
| BWC (g/100 cc) | 9.33 | 10.25 | 10.83 |
| BWC % improvement | — | 9.9% | 16.0% |

Conclusion and Summary of Examples 1-3 and Comparative Example 1

A summary of relevant data appears in Table 4 below:

TABLE 4

Summary of Data

| Example | Test | Description | Sheet Thickness (cm) | Density (g/cm$^3$) | BWC (g/100 cm$^3$) |
|---|---|---|---|---|---|
| Ex. 1 | CT#14299-8 | Wood based activated carbon CPL | 0.411 | 0.413 | 12.32 |
| Ex. 1 | CT#14299-10 | Wood based activated carbon CPW | 0.439 | 0.404 | 12.41 |
| Ex. 2 | CT#14266-1 | BVC-11 (nutshell) activated carbon 8 × 25 | 0.033 | 0.566881 | 16.1 |
| Ex. 2 | CT#14266-2 | BVC-11 (nutshell) activated carbon 8 × 35 | 0.0315 | 0.566881 | 14.14 |
| Ex. 3 | #3445-32-4-stack 1 | GAC, 20 sheet stack | 0.045 | 0.534 | 10.25 |
| Ex. 3 | #3445-32-4-stack 2 | GAC, 20 sheet stack | 0.045 | 0.534 | 10.83 |
| Comp. Ex. 1 | #3445-32-4 | Granular Activated Carbon (GAC) | N/A | 0.389 | 9.33 |

The invention claimed is:

1. A sorbent material sheet product, comprising:
   at least two sorbent material sheets, each of which has a defined upper surface and lower surface which have a combined total surface area,
   wherein each sorbent material sheet comprises a sorbent material and a binder,
   wherein each sorbent material sheet is stacked and arranged such that adjacent upper and lower surfaces of the separate sheets are substantially parallel and are aligned to allow fluid flow at least between the adjacent upper and lower surfaces, and
   wherein the sorbent material sheet product has a void volume of about 2% to about 25%.

2. The sorbent material sheet product of claim 1, wherein the sorbent material sheet product has a BWC stacking multiplier ratio of about 1.1 to about 1.3, wherein the BWC stacking multiplier ratio is defined by the formula:

BWC stacking multiplier ratio=[(measured BWC of entire sorbent material sheet product)/(measured BWC of individual sorbent material sheet outside of product)]/number of sorbent material sheets in the sorbent material sheet product.

3. The sorbent material sheet product of claim 1, wherein the individual sorbent material sheets, measured individually, have BWC values that are 5-15% higher than the BWC of the same weight of sorbent material in pelletized or powdered forms.

4. The sorbent material sheet product of claim 1, wherein at least one of the sorbent material sheets are configured as being flat, wound in a spiral cylinder, wound in an elliptical form, wound in an elongate rectangular bar, folded, laminated in an "S" shape, formed as concentric cylinders, formed as concentric ellipses, formed as a concentric rectangular bar, or as combinations of these forms.

5. The sorbent material sheet product of claim 1, wherein at least one of the sorbent material sheets has raised and/or depressed portions.

6. The sorbent material sheet product of claim 5, wherein the raised and/or depressed portions are present on adjacent sheets and are nested.

7. The sorbent material sheet product of claim 5, wherein the raised and/or depressed portions are present on adjacent sheets and are not nested.

8. The sorbent material sheet product of claim 1, wherein the sorbent material sheet product has a void volume of about 2% to about 10%.

9. The sorbent material sheet product of claim 1, wherein each individual sorbent material sheet has a density of about 0.08 g/cc to about 1.5 g/cc.

10. The sorbent material sheet product of claim 1, wherein the sorbent material sheet product has a BWC greater than about 10 g/100 cc.

11. The sorbent material product of claim 1, wherein the sorbent material sheet product has a BWC of about 7.0 g/100 cc to about 30 g/100 cc.

12. The sorbent material sheet product of claim 1, wherein the sorbent material sheets comprise sorbent material particles having at least two populations having different average particle diameters, and wherein the average particle diameters of the two populations have ratios of about 1:2 to about 1:10.

13. The sorbent material sheet product of claim 1, wherein the amount of binder and the amount of sorbent material sheet products are present in a gradient such that the amount of binder is highest at an outer portion of the sorbent material sheet product, and that the amount of binder is lowest at an inner portion of the sorbent material sheet product.

14. The sorbent material sheet product of claim 1, wherein at least one sorbent material sheet include holes, cuts, or apertures.

15. The sorbent material sheet product of claim 1, wherein the binder comprises at least one of polytetrafluoroethylenes (PTFE or TEFLON), polyvinylidene fluorides ($PVF_2$ or PVDF), ethylene-propylene-diene (EPDM) rubbers, polyethylene oxides (PEO), UV curable acrylates, UV curable methacrylates, heat curable divinyl ethers, polybutylene terephthalate, acetal or polyoxymethylene resin, fluoroelastomers, perfluoroelastomers (FFKM) and/or tetrafluoro ethylene/propylene rubbers (FEPM), aramid polymers, para-aramid polymers, meta-aramid polymers, poly trimethylene terephthalate, ethylene acrylic elastomers, polyimide, polyamide-imides, polyurethanesm, low density and high density polyethylene, polypropylene, biaxially oriented polypropylene (BoPP), polyethylene terephthalate (PET), biaxially oriented polyethylene terephthalate (BoPET), polychloroprene, copolymers, and combinations thereof.

16. A rolled sorbent material sheet product, comprising:
  a sorbent material sheet defining an upper surface and a lower surface and having a total surface area, and which comprises a sorbent material and a binder,
  wherein the sorbent material sheet is spiral wound to form adjacent sheet layers which allow fluid flow around and between adjacent sheet layers, and
  wherein the sorbent material sheet product has a void volume of about 2% to about 25%.

17. The rolled sorbent material sheet product of claim 16, wherein the sorbent material sheet in its rolled form has a BWC that is at least 10% higher than the BWC of the same sorbent material sheet in an unrolled form.

18. The rolled sorbent material sheet product of claim 16, wherein the rolled sorbent material sheet product has a BWC that is at least 10% higher than the BWC of a pelletized or powdered form of the substantially the same amount of sorbent material in the sorbent sheet.

19. The rolled sorbent material sheet product of claim 16, wherein the rolled sorbent material sheet product has a generally cylindrical shape having a length that is greater than its diameter.

20. The rolled sorbent material sheet product of claim 16, wherein the rolled sorbent material sheet product is wound to an average roll density of 500-700 kg/m$^3$.

21. The rolled sorbent material sheet product of claim 16, wherein the rolled sorbent material sheet product has a butane working capacity greater than about 10 g/100 cc.

22. The rolled sorbent material sheet product of claim 16, wherein the rolled sorbent material sheet product has a butane working capacity of about 7.0 g/100 cc to about 30 g/100 cc.

23. The rolled sorbent material sheet product of claim 16, wherein the rolled sorbent material sheet comprises at least two populations of sorbent material particles, wherein each of the at least two population shave different average particle diameters.

24. The rolled sorbent material sheet product of claim 16, wherein the rolled sorbent material sheets comprise sorbent material particles having at least two populations having different average particle diameters, and wherein the average particle diameters of the two populations have ratios of about 1:2 to about 1:10.

25. The rolled sorbent material sheet product of claim 16, wherein the binder comprises at least one of polytetrafluoroethylenes (PTFE or TEFLON), polyvinylidene fluorides ($PVF_2$ or PVDF), ethylene-propylene-diene (EPDM) rubbers, polyethylene oxides (PEO), UV curable acrylates, UV curable methacrylates, heat curable divinyl ethers, polybutylene terephthalate, acetal or polyoxymethylene resin, fluoroelastomers, perfluoroelastomers (FFKM) and/or tetrafluoro ethylene/propylene rubbers (FEPM), aramid polymers, para-aramid polymers, meta-aramid polymers, polytrimethylene terephthalate, ethylene acrylic elastomers, polyimide, polyamide-imides, polyurethanes, low density and high density polyethylene, polypropylene, biaxially oriented polypropylene (BoPP), polyethylene terephthalate (PET), biaxially oriented polyethylene terephthalate (BoPET), polychloroprene, copolymers, and combinations thereof.

26. A vapor adsorbing canister, comprising:
  the sorbent material sheet product of claim 1, and
  a housing at least partially encapsulating the sorbent material sheet product of claim 1.

27. The vapor adsorbing canister of claim 26, wherein the housing is flexible.

28. The vapor adsorbing canister of claim 26, wherein the housing comprises at least one of polytetrafluoroethylenes (PTFE or TEFLON), polyvinylidene fluorides ($PVF_2$ or PVDF), ethylene-propylene-diene (EPDM) rubbers, polyethylene oxides (PEO), UV curable acrylates, UV curable methacrylates, heat curable divinyl ethers, polybutylene terephthalate, acetal or polyoxymethylene resin, fluoroelastomers perfluoroelastomers (FFKM) and/or tetrafluoro ethylene/propylene rubbers (FEPM), aramid polymers, para-aramid, meta-aramid polymers, poly trimethylene terephthalate, ethylene acrylic elastomers, polyimide, polyamide-imides, polyurethanes, low density and high density polyethylene, polypropylene, biaxially oriented polypropylene (BoPP), polyethylene terephthalate (PET), biaxially oriented polyethylene terephthalate (BoPET), polychloroprene, copolymers, and combinations thereof.

29. The vapor adsorbing canister of claim 26, wherein the shape of the housing substantially conforms to the shape of the enclosed sorbent material sheet product of claim 1.

30. The vapor adsorbing canister of claim 26, further comprising at least one structure selected from tubes, inlet ports, outlet ports, sensors, valves, and fluid channels.

31. A vapor adsorbing canister, comprising,
the rolled sorbent material sheet product of claim 16, and
a housing at least partially encapsulating the rolled sorbent material sheet product of claim 16.

32. The vapor absorbing canister of claim 31, wherein the housing is flexible.

33. The vapor adsorbing canister of claim 31, wherein the housing comprises at least one of polytetrafluoroethylenes (PTFE or TEFLON), polyvinylidene fluorides ($PVF_2$ or PVDF), ethylene-propylene-diene (EPDM) rubbers, polyethylene oxides (PEO), UV curable acrylates, UV curable methacrylates, heat curable divinyl ethers, polybutylene terephthalate, acetal or polyoxymethylene resin, fluoroelastomers perfluoroelastomers (FFKM) and/or tetrafluoro ethylene/propylene rubbers (FEPM), aramid polymers, para-aramid, meta-aramid polymers, poly trimethylene terephthalate, ethylene acrylic elastomers, polyimide, polyamide-imides, polyurethanes, low density and high density polyethylene, polypropylene, biaxially oriented polypropylene (BoPP), polyethylene terephthalate (PET), biaxially oriented polyethylene terephthalate (BoPET), polychloroprene, copolymers, and combinations thereof.

34. The vapor adsorbing canister of claim 31, wherein the shape of the housing substantially conforms to the shape of the enclosed rolled sorbent material sheet product of claim 16.

35. The vapor adsorbing canister of claim 31, further comprising at least one structure selected from tubes, inlet ports, outlet ports, sensors, valves, and fluid channels.

36. A tank with integral vapor adsorption, comprising:
a tank structure,
at least one sorbent material sheet which has a defined upper surface and lower surface which have a combined total surface area, and wherein each sorbent material sheet comprises a sorbent material and a binder, and
at least one fastening device which fastens the sorbent material sheet to a surface of the tank that is not regularly immersed in volatile liquids contained within the tank.

37. The tank with integral vapor adsorption of claim 36, wherein the fastening device is an adhesive layer which is formed between one surface of the sorbent material sheet and a wall of the tank.

38. The tank with integral vapor adsorption of claim 36, wherein the adhesive comprises at least one of pressure sensitive adhesives, UV curing adhesives, thermally curing adhesives, hot melt adhesives, reactive multi-part adhesives, acrylic and (meth)acrylic adhesives, acrylate and (meth) acrylate adhesives, epoxy adhesives in one- or two-part formulations, urethane adhesives, copolymers, and combinations thereof.

39. The tank with integral vapor adsorption of claim 36, wherein the tank further includes at least one of fuel pump(s), fuel sending line(s), fuel return line(s), atmospheric vent line, port(s), valve(s), sensor(s), air inlet(s), open cell foam, baffle(s), bladder(s), and combinations of those.

40. The tank with integral vapor adsorption of claim 36, wherein the tank is a fuel tank with a "ship in a bottle" configuration.

41. An onboard refueling vapor recovery apparatus comprising the sorbent material sheet product of claim 1.

42. An onboard refueling vapor recovery apparatus comprising the rolled sorbent material sheet product of claim 16.

43. An onboard refueling vapor recovery apparatus comprising the vapor adsorbing canister of claim 26.

44. An onboard refueling vapor recovery apparatus comprising the vapor adsorbing canister of claim 31.

45. An onboard refueling vapor recovery apparatus comprising the tank with integral vapor adsorption of claim 36.

* * * * *